(12) United States Patent
Van Sprang

(10) Patent No.: US 10,201,882 B2
(45) Date of Patent: Feb. 12, 2019

(54) MACHINE TOOL AND MACHINE TOOL UNIT

(71) Applicant: FRANZ KESSLER GMBH, Bad Buchau (DE)

(72) Inventor: Joachim Van Sprang, Ravensburg (DE)

(73) Assignee: Franz Kessler GmbH, Bad Buchau (DE)

( * ) Notice: Subject to any disclaimer, the term of this patent is extended or adjusted under 35 U.S.C. 154(b) by 0 days.

(21) Appl. No.: 15/667,926

(22) Filed: Aug. 3, 2017

(65) Prior Publication Data

US 2017/0326697 A1   Nov. 16, 2017

Related U.S. Application Data

(63) Continuation of application No. PCT/EP2016/052921, filed on Feb. 11, 2016.

(30) Foreign Application Priority Data

Feb. 12, 2015   (DE) .................. 10 2015 001 643

(51) Int. Cl.
   *B23Q 1/70* (2006.01)
   *B23Q 1/00* (2006.01)
   (Continued)

(52) U.S. Cl.
   CPC .......... *B23Q 1/70* (2013.01); *B23Q 1/0027* (2013.01); *B23Q 5/10* (2013.01); *B23Q 17/00* (2013.01);
   (Continued)

(58) Field of Classification Search
   CPC ...................................................... B23Q 1/70
   See application file for complete search history.

(56) References Cited

U.S. PATENT DOCUMENTS 4,726,112 A * 2/1988 King et al. ............. H02K 15/14
                                                              29/596
5,636,949 A    6/1997 Nakamura et al.
(Continued)

FOREIGN PATENT DOCUMENTS

DE   42 01 013 A1   7/1993
DE   101 63 089 C1  7/2003

OTHER PUBLICATIONS

International Search Report and Written Opinion (Application No. PCT/EP2016/052921) dated Jun. 9, 2016.
(Continued)

*Primary Examiner* — Bentsu Ro
(74) *Attorney, Agent, or Firm* — Burr & Brown, PLLC

(57) ABSTRACT

A motor-driven machine tool unit having a stator unit and at least one rotor unit having a rotor shaft that is rotatable about an axis of rotation. The rotor unit includes at least one first bearing unit arranged in the end region of a tool and/or workpiece receptacle, and a second bearing unit arranged at the opposite end region for mounting the rotor shaft in the stator unit. At least one electrical power transmission unit for transmitting electrical power between the stator unit and the rotor unit is provided. The problem addressed by the invention is that of better satisfying the increasing demands on modern machine tools or machine tool units. This problem is solved by the electrical power transmission unit is arranged in the end region opposite the tool and/or workpiece holder and/or on the second bearing unit.

12 Claims, 2 Drawing Sheets

(51) Int. Cl.
  *B23Q 17/00* (2006.01)
  *B23Q 5/10* (2006.01)
  *B23Q 17/22* (2006.01)
  *G01B 7/00* (2006.01)
  *G01D 5/20* (2006.01)

(52) U.S. Cl.
  CPC ..... *B23Q 17/2225* (2013.01); *B23Q 17/2241* (2013.01); *G01B 7/003* (2013.01); *G01D 5/2086* (2013.01)

(56) References Cited

U.S. PATENT DOCUMENTS

| | | | |
|---|---|---|---|
| 5,770,936 A | | 6/1998 | Hirai et al. |
| 5,852,338 A | * | 12/1998 | Boyd, Jr. et al. ........ H02K 5/16 310/89 |
| 2002/0101127 A1 | * | 8/2002 | Silva .................. H01R 3/00 310/231 |
| 2004/0208720 A1 | | 10/2004 | Wehrfritz |
| 2007/0270264 A1 | * | 11/2007 | Grunwald et al. ...... F16H 47/08 475/91 |

OTHER PUBLICATIONS

Informal Comments to Written Opinion (Application No. PCT/EP2016/052921) dated Jul. 19, 2016.

English translation of International Preliminary Report on Patentability (Application No. PCT/EP2016/052921) dated Aug. 24, 2017.

\* cited by examiner

MACHINE TOOL AND MACHINE TOOL UNIT

CROSS REFERENCE TO RELATED APPLICATIONS

This application is a continuation of International Application No. PCT/EP2016/052921 filed Feb. 11, 2016, which designated the United States, and claims the benefit under 35 USC § 119(a)-(d) of German Application No. 10 2015 001 643.1 filed Feb. 12, 2015, the entireties of which are incorporated herein by reference.

FIELD OF THE INVENTION

The present invention relates to a motor-driven machine tool unit such as a multi-axis turning head, a motor spindle, a rotary table or the like.

BACKGROUND OF THE INVENTION

In motor-driven machine tool units such as spindles, in particular, motor spindles, rotary tables or multi-axis turning heads etc., there are in principle two different bearing arrangements as to how the rotor unit is mounted in/on the stator unit by way of its rotor shaft. The detail thereof can vary somewhat, however, depending on the embodiment.

In a first bearing principle, each case one or two angular ball bearings are usually positioned both on the front and on the rear of the rotor shaft. The angular ball bearings, arranged, for example, in what is known as the O- or X-arrangement, absorb radial forces and axial compressive forces. The rear bearings absorb radial forces and axial tensile forces.

The second possibility or bearing arrangement is referred to as the "fixed/floating bearing combination". In this case, the bearings are usually designed such that the front bearing position or bearing unit is in the form of a fixed bearing and absorbs radial forces and axial forces in both directions. The rear bearing position or bearing unit is in this case configured as a floating bearing and absorbs only radial forces. This "fixed/floating bearing combination" is a very clearly structured, force-distributing arrangement that results from engineering mechanics.

For example, in machine tool spindles, what is known as the floating bearing is frequently realized in the rear region of the spindle or at the opposite end of the rotor shaft from the tool receptacle or workpiece receptacle with the aid of a (single) rolling bearing or cylindrical roller bearing. This cylindrical roller bearing consists generally of an inner race, a cage with integrated rollers or rolling elements and an outer race. The roller cage is guided and held either via the inner race or via the outer race.

This arrangement, which has been used in practice for several decades, also implies that the rear bearing is incapable of absorbing axial forces, with the result that the majority of the expansion movements of the shaft or rotor unit, regardless of whether they are the result of external forces or of thermal expansions or temperature influences, act only in the rear region. This in turn has the result that, for example, in motor spindles, axial movement of several tenths of a millimeter, or up to about one millimeter, sometimes arises in the rear region of the mounted motor shaft. Such movements or changes of length that are very large in/for the machine tool region do not usually have any disruptive effect at this point, however.

The great advantage of the previous fixed/floating bearing combination in such machine tool units is that the fixed bearing, which is fitted close to the tool receptacle, for example, close to the spindle, reduces axial movements of the spindle in the front region to a minimum. This in turn has the result that the tool is exposed to only very small axial displacements. This is of enormous advantage especially in the modern machine tool industry or in modern high-performance motor spindles or the like, since very high accuracy demands are nowadays made of corresponding machine tools such as CNC machines or the like. Here, accuracy not just of hundredths of a millimeter but by all means also thousandths of a millimeter has to be maintained.

Furthermore, in recent years, increasing demands have needed to be met for machining and, in particular, for parameters such as infeed and angular speed. Thus, in the meantime, tools have also come into use, wherein, during machining, the actual thickness or dimensional accuracy is determined by means of corresponding sensors and used to control the machine tool or to adjust the tool. For example, ultrasonic sensors have come into use which are arranged on the rotor shaft or in/on the (rotating) tool. For this purpose, in recent years, use has increasingly been made of electrical rotary feedthroughs or energy transmission systems, which transmit electrical energy from the static part, or from the stator, of the machine tool units to the rotating part, or the rotor, of the machine tool units.

This is realized, for example, with transmission coils which consist substantially of two operatively connected coils (with ferrite cores) and between which a non-adjustable or defined gap is present. The dimensional accuracy of the gap is very important in order not to impair energy transmission and/or signal transmission. Therefore, these transmission coils have hitherto been arranged in the front region of the workpiece, or of the front fixed bearing, since the dimensional accuracy of the gap has hitherto only been able to be ensured here.

However, a disadvantage is that, in the front region of the tool, there is the risk that, as a result of dust, chips, cooling lubricant etc., impairment or soiling of the energy transmission unit and especially of the gap and thus, inter alfa, of the signal transmission can arise. Accordingly, errors in the control of the tool and thus machining inaccuracies can result.

Thus, the transmission unit also takes up installation space, which is very disruptive in the region of tool machining and additionally there is also a risk here of the spindle colliding with the workpiece.

SUMMARY OF THE INVENTION

Against this background, the object of the present invention is to propose a machine tool, or a motor-driven machine tool unit, which complies better with the increasing demands made of modern machine tools or machine tool units.

Accordingly, a machine tool unit according to the present invention is characterized in that the electrical energy transmission unit, in particular two operatively connected coils each having an advantageous ferrite core, is arranged or at least partially fixed in the region opposite the tool and/or workpiece receptacle, in particular the rear end region, and/or on the second bearing unit or on the floating bearing.

Thus, according to the present invention, a reversal of the previously implemented principle that has proven successful for decades in machine tool units is realized. This means that the present invention not only departs from, but even contradicts the previous fixed/floating bearing principle in machine tool units such as motor spindles, etc. This is because the gap between the coils has to be as constant as possible, or non-adjustable/defined, in order that, as far as possible, no errors or impairments are generated. It has hitherto been essential to avoid arranging the gap between the coils in the rear region of the machine tool unit with the temperature-related relatively large increases in length of up to about 1 mm.

The axial change in length or expansion especially of the rotor unit or of the rotor shaft is based substantially on thermal changes or heat losses in the system. Relevant axial changes or expansions of the rotor unit become effective comparatively slowly, however.

Furthermore, the energy transmission unit in the rear region of the machine tool unit or on sides of the region remote from the machining/tool/workpiece, comparatively arbitrary positioning and (large) dimensioning of the energy transmission unit can be realized. In this region, the energy transmission unit according to the present invention does not disturb machining and nor is there any risk of a collision with or damage to the workpiece to be machined, or the like.

Preferably, the second bearing unit is in the form of a floating bearing, for example of a ball bearing, or of two angular ball bearings in an O- or X-arrangement. This means that the second bearing unit, or the floating bearing, can absorb only radial forces and no axial forces.

Advantageously, an element is provided, in particular a guide element and/or a guide sleeve, which is connected firmly to the second bearing unit, in particular an outer race of the rear bearing, or floating bearing, and which transmits a change in axial position or length and/or is displaceable in particular relative to static components of the stator unit axially or relative to one another.

Preferably, a spring element is provided, with which the element, in particular the guide element and/or the guide sleeve, is advantageously fixed in position.

Advantageously, at least one readjusting unit for axially adjusting at least the guide element and/or one of the coils of the electrical energy transmission unit is provided. With the aid of the advantageous readjusting unit, a temperature-related change in length, in particular of the rotor shaft, can be compensated in that a spacing or a gap between the two operatively connected coils is equalizable or can be kept constant. This ensures advantageous signal transmission or quality assurance and thus improved operation.

For example, the readjusting unit can be realized as an active readjusting unit, wherein, for example, with the aid of a sensing unit for sensing a change in length, in particular, the temperature-related change in length of the rotor shaft or the like, an actuator can be controlled, which accordingly (axially) (re)adjusts the second coil, operatively connected to the first static coil. In this way, high accuracy in the keeping of the (axial) spacing or the gap (oriented in the direction of the axis of rotation) between the two operatively connected coils constant is achieved.

Preferably, the readjusting unit comprises at least one spring element. In this way, the constructive outlay and outlay on control technology for readjusting or keeping the gap or spacing between the two operatively connected coils constant is advantageously reduced or minimized. This results in economically favorable operation and at the same time in advantageous signal transmission or operation.

BRIEF DESCRIPTION OF THE DRAWINGS

An exemplary embodiment of the present invention is illustrated in the drawing and explained in more detail in the following text with reference to the figures.

DETAILED DESCRIPTION OF THE INVENTION

Figure 1:
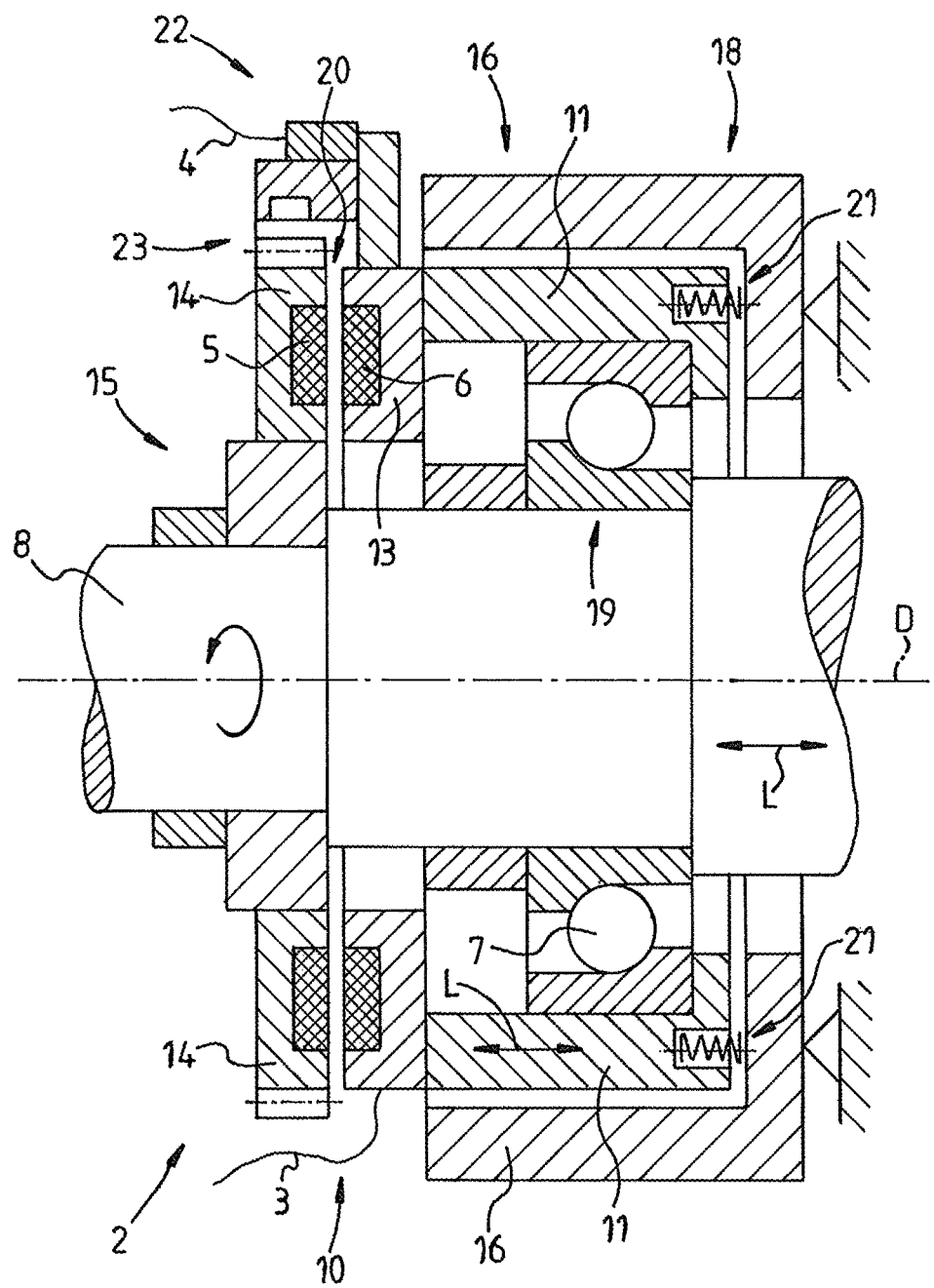
FIG. 1 shows a schematic section through a rear region of a first motor spindle with a floating bearing unit and a first electrical energy transmission unit according to the present invention.
Figure 2:
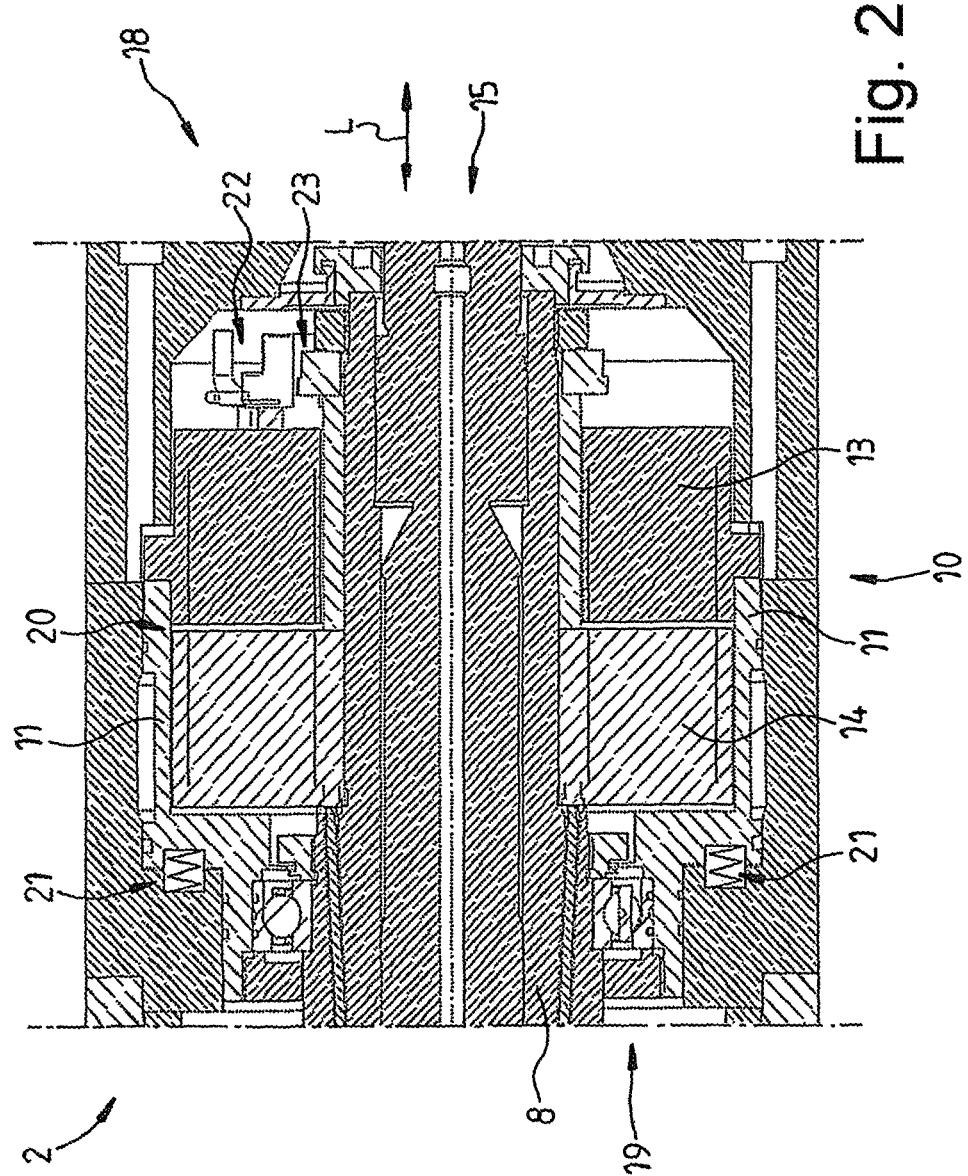
FIG. 2 shows a schematic section through a rear region of a second motor spindle with a floating bearing unit and a second electrical energy transmission unit according to the present invention.

The figures schematically illustrate two similar embodiments of the present invention, wherein a rotor shaft 8 has a rear bearing 19 in a region, known as the "rear region" 18, remote from a tool/workpiece (not illustrated in more detail), of a motor spindle. The bearing 19 is in the form of a floating bearing 19 and connected to a stator unit 16 of the motor spindle via a guide ring 11.

Arranged/fixed on the guide ring/element 11 is a first coil 13, in particular a ferrite-core coil 13, which is operatively connected to a second coil 14, or ferrite-core coil 14. The second ferrite-core coil 14 is arranged/fixed on the rotor shaft 8.

During operation of the motor spindle 2, i.e. when the motor shaft 8 is rotating, the motor shaft 8, inter alia, heats up, and so a change in length L of the motor shaft 8 occurs. This change in length L in the direction of an axis of rotation D would change or enlarge an axial gap 20 between the two motor coils 13, 14, although this would be disadvantageous for electrical signal transmission from one coil 13, 14 to the other coil 13, 14. According to the present invention, however, axial adjustment of the "static" coil 13 takes place by means of the guide ring 11 and a spring 21. Preferably, several springs 21 are arranged in a manner distributed as regularly as possible in the circumferential direction.

In the event of an in particular temperature-related expansion of the rotor shaft 8 along the axis of rotation D, the inner race of the bearing unit 19 is accordingly adjusted in the longitudinal direction L, this advantageously resulting, via the rolling elements or balls and also the outer race of the rolling bearing 19 and the guide ring, in axial adjustment of the non-rotating or "static" coil 13. By means of the spring 21 or springs 21, an advantageous restoring force, inter alia, is generated, or a pressure force of the guide ring 11 on the outer race of the rolling bearing 19 is generated.

Furthermore, an advantageous rotary transducer 22 is provided, which is operatively connected to the stator unit 16, or the non-rotating or "static" coil 13, or the guide ring 11. A toothing structure 23, which comprises the rotor unit 15, allows advantageous sensing of the position of the rotor shaft 8 in the circumferential direction.

For example, in the event of a change in temperature of about 20° to 200° C., a change in length L of about 1 mm is generated. This would have a negative effect on signal transmission between the two coils 13, 14, this being advantageously suppressed according to the invention, however. This is because, according to the present invention, a disadvantageous change in the electrical signal to be transmitted on account of a change in length L of the motor shaft 8 is prevented.

In general, according to the present invention, a variety of different parameters or process parameters or the like are monitored/communicated by the rotating side or by the rotor unit 15. Thus, for example, the present invention can be used for the parameters: amount of substance, magnetism, electromagnetic radiation, mounting, acoustics, temperature, oscillation, spacing, force, vibration, collision and induction and/or the like.

On the static side, or the stator unit, process analysis or evaluation/control/regulation/process control can advantageously take place, wherein, inter aria, a digital filter, analog filter, what is known as a "B box" and also a phase-locked loop and/or the like can be used.

LIST OF REFERENCE SIGNS

2 Motor spindle
3 Coil cable
4 Rotary encoder cable
5 Ferrite core
6 Ferrite core
7 Rolling element
8 Motor shaft
10 Energy transmission unit
11 Guide element
13 Coil
14 Coil
15 Rotor unit
16 Stator unit
18 End region
19 Bearing
20 Gap
21 Spring
22 Rotary encoder
23 Toothing
L Change in length
D Axis of rotation

The invention claimed is:

1. A motor-driven machine tool unit having a stator unit and a rotor unit with at least one rotor shaft that is rotatable about an axis of rotation, wherein the rotor unit comprises (i) at least one first bearing unit arranged in the end region of a tool receptacle and/or workpiece receptacle, (ii) a second bearing unit arranged in the opposite end region for mounting the rotor shaft in the stator unit, (iii) at least one electrical energy transmission unit for transmitting electrical energy between the stator unit and the rotor unit, wherein the electrical energy transmission unit has at least two operatively connected coils, wherein the electrical energy transmission unit is arranged in the end region opposite the tool receptacle and/or workpiece receptacle and on the second bearing unit, and wherein an axial spacing or gap oriented in the direction of the axis of rotation is provided between the two operatively connected coils, and (iv) at least one readjusting unit for axially adjusting at least one of the coils of the electrical energy transmission unit.

2. The machine tool unit as claimed in claim 1, further comprising at least one guide element arranged on the second bearing unit to guide the second bearing unit.

3. The machine tool unit as claimed in claim 2, wherein at least part of the electrical energy transmission unit and/or at least one of the coils of the electrical energy transmission unit is arranged on and/or fixed to the guide element and/or the second bearing unit.

4. The machine tool unit as claimed in claim 2, further comprising at least one readjusting unit for axially adjusting at least the guide element.

5. The machine tool unit as claimed in claim 4, wherein the readjusting unit comprises at least one spring element.

6. The machine tool unit as claimed in claim 1, wherein the electrical energy transmission unit at least partially comprises a rotary encoder device for sensing the rotary position of the rotor shaft unit.

7. The machine tool unit as claimed in claim 6, wherein the electrical energy transmission unit has at least one detection structure for the rotary encoder device.

8. The machine tool unit as claimed in claim 6, wherein the detection structure of the electrical energy transmission unit is operatively connected to a sensor of the rotary encoder device.

9. A machine tool having a machine tool unit as claimed in claim 1.

10. A multi-axis turning head having a machine tool unit as claimed in claim 1.

11. A motor spindle having a machine tool unit as claimed in claim 1.

12. A rotary table having a machine tool unit as claimed in claim 1.

* * * * *